United States Patent [19]

Abe et al.

[11] Patent Number: 5,439,661
[45] Date of Patent: Aug. 8, 1995

[54] PROCESS FOR PRODUCING HYDROGEN CYANIDE

[75] Inventors: Takafumi Abe; Shuji Ebata; Kazuhiro Sugamura; Taiji Matsuzaki; Hirofumi Higuchi, all of Niigata, Japan

[73] Assignee: Mitsubishi Gas Chemical Company, Inc., Tokyo, Japan

[21] Appl. No.: 330,202

[22] Filed: Oct. 27, 1994

[30] Foreign Application Priority Data

Dec. 6, 1993 [JP] Japan .................................. 5-305222
Dec. 6, 1993 [JP] Japan .................................. 5-305223

[51] Int. Cl.⁶ ................................................. C01C 3/02
[52] U.S. Cl. .................................................... 423/373
[58] Field of Search ........................................... 423/373

[56] References Cited

U.S. PATENT DOCUMENTS

| | | | |
|---|---|---|---|
| 1,920,795 | 8/1933 | Jaeger | 423/373 |
| 2,042,451 | 6/1936 | Bond et al. | 423/373 |
| 2,086,507 | 7/1937 | Larson | 423/373 |
| 2,534,000 | 12/1950 | Coopey | 423/373 |

*Primary Examiner*—Wayne Langel
*Attorney, Agent, or Firm*—Frishauf, Holtz, Goodman & Woodward

[57] ABSTRACT

There is disclosed a process for efficiently producing hydrogen cyanide at a reaction temperature of preferably 250° to 550° C. by a catalytic dehydrative reaction of formamide which comprises employing as a catalyst, a manganese oxide (MnO) and/or a magnesium oxide (MgO) each modified with an alkali metal (Na, K, Rb, Cs, etc.). The above process is capable of producing hydrogen cyanide at an enhanced conversion efficiency of formamide and at a high selectivity while minimizing the by-production of ammonia. The use of the catalyst comprising as a principal component, MnO modified with an alkali metal is particularly effective in prolonging its service life and enables a long-term stable operation.

11 Claims, No Drawings

PROCESS FOR PRODUCING HYDROGEN CYANIDE

BACKGROUND OF THE INVENTION

1. Field of the Invention

The present invention relates to a process for producing hydrogen cyanide by using formamide as a starting raw material.

Hydrogen cyanide is an indispensable basal chemical to be used as various starting raw materials for organic synthesis of mainly methacrylic ester, lactic acid and the like and also to be used in mining and metallurgical industries. In addition, it has recently expanded the demand as the starting raw materials for the synthesis of pharmaceuticals and agrichemicals and the like.

2. Description of Related Arts

As a process for industrially producing hydrogen cyanide, there are spread the thermal cracking of formamide, the oxidation of methane along with ammonia and a like process. Hydrogen cyanide is also mass-produced as the byproduct in the process for producing acrylonitrile by the oxidation of propylene along with ammonia.

The production of hydrogen cyanide by the thermal cracking of formamide is represented by the reaction equation (1) in which hydrogen cyanide and water each in one (1) mol are produced from one (1) mol of formamide,

$$HCONH_2 \rightarrow HCN + H_2O \tag{1}$$

which reaction is accompanied by the reaction equation (2) in which the formamide is decomposed into ammonia and carbon monoxide.

$$HCONH_2 \rightarrow NH_3 + CO \tag{2}$$

In order to efficiently produce hydrogen cyanide from formamide, it is indispensable to rapidly force the reaction as represented by the equation (1) and at the same time to suppress the reaction represented by the equation (2) as much as possible. Accordingly, attempts have heretofore been made to research and develop a catalyst enhanced in activity and selectivity for the reaction represented by the equation (1).

There are described, for example, in U.S. Pat. No. 2,086,507 that a fused manganese oxide is effective as a catalyst in the production of hydrogen cyanide from formamide and in U.S. Pat. No. 2,534,000, a process for producing hydrogen cyanide in high selectivity by using a manganese oxide as a catalyst and by efficiently evaporating formamide under vacuum.

However, these catalysts that have heretofore been employed involve the problem that in spite of their high activity the selectivity to the objective hydrogen cyanide is not so high and ammonia is by-produced in an amount of about 10%.

The by-production of ammonia not only lowers the yield of the objective hydrogen cyanide but also functions to accelerate the polymerization of hydrogen cyanide in the form of liquid. Thus, in the case of isolating the produced hydrogen cyanide, the by-produced ammonia must be removed by washing in advance, the reaction gas with sulfuric acid or the like. The ammonia sulfate which is produced from sulfuric acid and ammonia is discharged as a byproduct in a large amount from some chemical industries, but is not so hailed as before as the fertilizer because of the soil being acidified by the use thereof. With the enhanced environmental protection motion, the problem with the treatment of the ammonium sulfate has recently been materialized. As mentioned hereinbefore, the by-production of ammonia gives rise to an increase in the production cost of hydrogen cyanide as well as the problem the treatment of ammonium sulfate. Under such circumstances, it is eagerly desired to develop a catalyst capable of producing hydrogen cyanide in high selectivity by suppressing the by-production of ammonia and carbon monoxide.

SUMMARY OF THE INVENTION

In view of the foregoing, intensive research and investigation were made by the present inventors in order develop a process for producing hydrogen cyanide in high yield from formamide by solving the disadvantages of the conventional processes as hereinbefore described. As a result, it has been found that the aforestated object is attained by catalytically dehydrating formamide in the presence of at least one member selected from the group consisting of a manganese oxide modified with an alkali metal and a magnesium oxide modified with an alkali metal. The present invention has been accomplished on the basis of the above-mentioned finding.

That is to say, the object of the present invention is to provide a process capable of producing hydrogen cyanide in high yield under relatively mild conditions, and the gist thereof lies in the process for producing hydrogen cyanide characterized by catalytically dehydrating formamide by using, as a catalyst, at least one member selected from the group consisting of a manganese oxide modified with an alkali metal and a magnesium oxide modified with an alkali metal.

DESCRIPTION OF PREFERRED EMBODIMENT

The catalyst to be used in the present invention is a manganese oxide and/or a magnesium oxide each modified with an alkali metal. Of these a manganese oxide modified with an alkali metal is particularly preferable, since there is not observed in it deterioration of activity with the elapse of time. The aforesaid oxide may be used alone or as a mixture with another oxide. The molar ratio of an alkali metal to a manganese oxide and/or a magnesium oxide in the catalyst to be used in the present invention is in the range of 0.001 to 0.2, preferably 0.01 to 0.15. Examples of alkali metals include Li, Na, K, Rb, Cs and Ft. Of these are particularly preferable Na, K, Rb and Cs. The exemplified alkali metal may be used alone or in combination with another one.

The manganese oxide and magnesium oxide each modified with the alkali metal or metals are each not specifically limited in the process for preparing the same bum are each prepared usually by firing a mixture of an alkali metal compound and a manganese compound or a magnesium compound each alone or the mixture of both the compounds. Each of the manganese compound, magnesium compound and alkali metal compound may be any one, provided that it is convertible into an oxide by firing. Preferably usable examples include a nitrate, carbonate, an organic carboxylic acid salt and a hydroxide. The firing temperature may be any temperature, provided that it is not lower than the temperature at which the alkali metal salt and manganese salt are each thermally decomposed into respective oxides. It is in the range of usually 300° to 1000° C., particularly 350° to 800° C. The manganese oxide to be employed in the process according to the present invention comprises manganese monoxide (MnO), preferably comprises manganese monoxide (MnO) as a principal component and therefore, it is preferable to carry out the firing in a reductive atmosphere in order to prevent MnO from being oxidized. The magnesium oxide to be employed comprises magnesium monoxide (MgO), preferably comprises magnesium monoxide (MgO) as a principal component and it is fired in an atmosphere of air. The manganese oxide and/or the magnesium oxide each modified with an alkali metal according to the present invention are usually used as a fixed-bed catalyst, and in the case of production on an industrial scale, the catalyst is molded into a proper shape and size as necessary in order to reduce the pressure loss through a catalyst bed.

The reaction temperature in the catalytic dehydrative reaction in the process of the present invention is in the range of preferably 250° to 550° C., more preferably 300° to 500° C. A reaction temperature lower than 250° C. results in a lower rate of reaction, whereas that higher than 550° C. leads to deterioration of the selectivity to hydrogen cyanide.

The reaction pressure in the present invention may be atmospheric pressure to reduced pressure but the partial pressure of formamide is preferably lower for the purpose of suppressing the decomposition of formamide at the time of its vaporization and improving the selectivity to hydrogen cyanide at the time of the hydrative reaction. Accordingly, the reaction is carried out preferably under reduced pressure, especially in the range of 10 to 300 mmHg. It is also effective to lower the partial pressure of formamide by diluting it with an inert gas in the reaction. The inert gas can be exemplified by helium, argon, nitrogen and carbon dioxide. In addition, the use of oxygen or the mixture of oxygen and an inert gas is efficacious in burning carbonaceous substance and tarry substance that are by-produced in slight amounts and in preventing such substances from adhering to the surfaces of the catalyst, thus enabling to maintain the catalyst activity for a long period of time.

As described hereinbefore, the present invention provides a process for producing hydrogen cyanide from formamide in high yield while suppressing the by-production of ammonia to the utmost by the use of the catalyst comprising a manganese oxide and/or a magnesium oxide each modified with an alkali metal, thereby rendering itself highly valuable from the industrial point of view.

In the following, the present invention will be described in more detail with reference to comparative examples and working examples, which however, shall not be construed to limit the present invention thereto.

COMPARATIVE EXAMPLE 1

Preparation of catalyst: Manganese carbonate (SP grade, Mn content of 44.3%, produced by Chuo Denki Kogyo Co., Ltd.) in an amount of 80 g (0.645 mol) was placed in an electric furnace and heated at 450° C. for 8 hours in a stream of hydrogen. The manganese oxide thus obtained was molded, crushed and arranged to 10 to 20 mesh size.

Reaction: 3.0 g of the manganese oxide obtained in the above-mentioned way was packed in a quartz-made tubular reactor having 10 mm inside diameter and 300 mm length equipped with a thermometer sheath and heated so that the temperature of the lower part of the catalyst bed was maintained at 400° C. In addition, quartz-made Raschig rings with 3/2 mm outside/inside diameter and 3 mm height were packed above the catalyst bed and heated to 100° to 400° C. to constitute the evaporating zone of formamide. Then formamide at 10 g/hr rate and air at 240 ml/hr rate were introduced into the reactional system from the top of the tubular reactor, while keeping a pressure of 100 mmHg.

The reaction gas discharged from the tubular reactor at the bottom thereof was cooled to 50° C. or lower and introduced into a vacuum control portion by way of an absorption bottle containing 10% aqueous solution of NaOH and an absorption bottle containing 10% sulphuric acid in this order using three-way ball valve. A sampling line was branched from the three-way ball valve and connected to the vacuum control portion by way of an absorption bottle containing 150 ml of water and an absorption bottle containing 150 ml of 10% aqueous solution of NaOH in this order.

After 5 hours from the start of the reaction, the reactional gas was sampled for one (1) hour. The hydrogen cyanide collected in water and aqueous solution of NaOH, respectively was determined by titrating with silver nitrate. The ammonia dissolved in water was determined by ion chromatography and unreacted formamide was determined by gas chromatography.

As a result, after 5 hours from the start of the reaction, the conversion efficiency of formamide, yield of hydrogen cyanide and yield of ammonia were 99.5%, 89.3% and 10.2%, respectively, and after 24 hours therefrom, the conversion efficiency of formamide, yield of hydrogen cyanide and yield of ammonia were 96.5%, 85.0% and 11.5%, respectively. Thus, deterioration of the catalytic activity with the elapse of time was observed.

Example 1

Preparation of catalyst: To 51.5 g of magnesium carbonate was added 0.88 g of sodium carbonate (produced by Wako Pure Chemical Industries, Ltd.) that had been dissolved in 30 g of water, followed by kneading for one (1) hour. Then, the resultant kneaded product was dried at 110° C. for 15 hours, calcined and fired at 450° C. for 5 hours in a stream of nitrogen containing 10% of hydrogen and thereafter crushed to a uniform size in the range of 10 to 20 mesh to obtain 30 g of the crushed product as a catalyst.

Reaction: The procedure in the Reaction of Comparative Example 1 was repeated to carry out the dehydrative reaction of formamide except that the above-mentioned catalyst was packed in the tubular reactor in place of manganese oxide.

As a result, after 5 hours from the start of the reaction, the conversion efficiency of formamide, yield of hydrogen cyanide and yield of ammonia were 99.5%, 95.2% and 4.3%, respectively, and after 24 hours therefrom, the conversion efficiency of formamide, yield of hydrogen cyanide and yield of ammonia were 99.7%, 95.3% and 4.4%, respectively. Thus, deterioration of the catalytic activity with the elapse of time was not observed.

Example 2

The procedure in Example 1 was repeated to carry out the dehydrative reaction of formamide except that there was used as a catalyst, a manganese oxide incorporated with potassium in an amount of 10 mol % based on manganese to take the place of sodium.

As a result, after 5 hours from the start of the reaction, the conversion efficiency of formamide, yield of hydrogen cyanide and yield of ammonia were 99.4%, 94.2% and 5.2%, respectively.

Example 3

The procedure in Example 1 was repeated to carry out the dehydrative reaction of formamide except that there was used as a catalyst, a manganese oxide incorporated with cesium in an amount of 8.4 mol % based on manganese to take the place of sodium.

As a result, after 5 hours from the start of the reaction, the conversion efficiency of formamide, yield of hydrogen cyanide and yield of ammonia were 99.3%, 97.6% and 1.7%, respectively.

COMPARATIVE EXAMPLE 2

Preparation of catalyst: Basic magnesium carbonate (MgO content of 40 to 45% by weight, produced by Kanto Chemical Co., Ltd.) in an amount of 80 g was placed in an electric furnace and heated at 450° C. for 8 hours. The magnesium oxide thus obtained was crushed and arranged to 10 to 20 mesh size.

Reaction: The procedure in Comparative Example 1 was repeated to carry out the dehydrative reaction of formamide except that there was used as a catalyst, 3.0 g of the magnesium oxide that has been produced in the above-mentioned manner.

As a result, after 5 hours from the start of the reaction, the conversion efficiency of formamide, yield of hydrogen cyanide and yield of ammonia were 99.3%, 90.2% and 9.0%, respectively, and after 24 hours therefrom, the conversion efficiency of formamide, yield of hydrogen cyanide and yield of ammonia were 94.7%, 83.8% and 10.9%, respectively. Thus, deterioration of the catalytic activity with the elapse of time was observed.

The catalyst taken out from the tubular reactor after the completion of the reaction was slightly turned to a brown color and in addition, coking was observed.

Example 4

Preparation of catalyst: To 8.00 g of the magnesium oxide that had been produced in Comparative Example 2 were added 0.68 g of sodium carbonate (produced by wako Pure Chemical Industries, Ltd.) and 5 g of water, followed by kneading for one (1) hour. Then, the kneaded product was extrusion-molded to 1 mm diameter by 5 to 10 mm length, dried at 110° C. for 15 hours and thereafter, calcined at 500° C. for 5 hours to produce a catalyst.

Reaction: The procedure in Comparative Example 1 was repeated to carry out the dehydrative reaction of formamide except that the catalyst produced in the aforesaid manner was used.

As a result, after 5 hours from the start of the reaction, the conversion efficiency of formamide, yield of hydrogen cyanide and yield of ammonia were 99.7%, 93.3% and 5.0%, respectively, and after 24 hours therefrom, the conversion efficiency of formaide, yield of hydrogen cyanide and yield of ammonia were 97.6%, 92.3% and 5.1%, respectively. Thus, deterioration of the catalytic activity with the elapse of time was slightly observed.

Example 5

The procedure in Example 4 was repeated to carry out the dehydrative reaction of formamide except that there was used as a catalyst, a magnesium oxide incorporated with rubidium in an amount of 2.4 mol % based on magnesium to take the place of sodium.

As a result, after 5 hours from the start of the reaction, the conversion efficiency of formamide, yield of hydrogen cyanide and yield of ammonia were 99.2%, 93.8% and 5.1%, respectively.

Example 6

The procedure in Example 4 was repeated to carry out the dehydrative reaction of formamide except that there was used as a catalyst, a magnesium oxide incorporated with cesium in an amount of 2.9 mol % based on magnesium to take the place of sodium.

As a result, after 5 hours from the start of the reaction, the conversion efficiency of formamide, yield of hydrogen cyanide and yield of ammonia were 99.4%, 95.8% and 3.6%, respectively.

What is claimed is:

1. A process for producing hydrogen cyanide by a catalytic dehydrative reaction of formamide which process comprises employing as a catalyst at least one member selected from the group consisting of a manganese oxide modified with an alkali metal and a magnesium oxide modified with an alkali metal.

2. The process according to claim 1 wherein the alkali metal is at least one member selected from the group consisting of Ha, K, Rb and Cs.

3. The process according to claim 1 wherein the molar ratio of the alkali metal to at least one oxide selected from the manganese oxide and the magnesium oxide is 0.001 to 0.2.

4. The process according to claim 1 wherein the catalytic dehydrative reaction of formamide is effected at a temperature in the range of 250° to 550° C.

5. The process according to claim 1 wherein the catalytic reaction of formamide is effected at a reduced pressure in the range of 10 to 300 mmHg.

6. A process for producing hydrogen cyanide by a catalytic dehydrative reaction of formamide which process comprises employing as a catalyst a manganese oxide modified with an alkali metal.

7. The process according to claim 6 wherein the alkali metal is at least one member selected from the group consisting of Na, K, Rb and Cs.

8. The process according to claim 6 wherein the molar ratio of the alkali metal to the manganese oxide is 0.001 to 0.2.

9. The process according to claim 6 wherein the catalytic dehydrative reaction of formamide is effected at a temperature in the range of 250° to 550° C.

10. The process according to claim 6 wherein the manganese oxide comprises manganese monoxide (MnO) as a principal component.

11. The process according to claim 6 wherein the catalytic reaction of formamide is effected at a reduced pressure in the range of 10 to 300 mmHg.

* * * * *

UNITED STATES PATENT AND TRADEMARK OFFICE
CERTIFICATE OF CORRECTION

PATENT NO. : 5,439,661
DATED : August 8, 1995
INVENTOR(S) : ABE et al

It is certified that error appears in the above-identified patent and that said Letters Patent is hereby corrected as shown below:

Column 6, line 34, Claim 2: replace "Ha" with --Na--.

Signed and Sealed this

Twenty-first Day of July, 1998

Attest:

BRUCE LEHMAN

*Attesting Officer*     *Commissioner of Patents and Trademarks*